(12) United States Patent
Sullivan et al.

(10) Patent No.: US 9,833,864 B2
(45) Date of Patent: Dec. 5, 2017

(54) METHOD OF EXCHANGING A FILTER ASSEMBLY

(71) Applicant: 37Degree Filters, Inc., San Francisco, CA (US)

(72) Inventors: Ian Sullivan, Los Altos, CA (US); Christopher M. Hubbard, Jefferson, OR (US)

(73) Assignee: Christopher Hubbard, Corte Madera, CA (US)

( * ) Notice: Subject to any disclaimer, the term of this patent is extended or adjusted under 35 U.S.C. 154(b) by 371 days.

(21) Appl. No.: 14/033,225

(22) Filed: Sep. 20, 2013

(65) Prior Publication Data

US 2014/0082910 A1    Mar. 27, 2014

Related U.S. Application Data

(60) Provisional application No. 61/704,409, filed on Sep. 21, 2012.

(51) Int. Cl.
| | |
|---|---|
| *B23P 6/00* | (2006.01) |
| *B29C 73/00* | (2006.01) |
| *G06Q 30/06* | (2012.01) |
| *B23P 19/04* | (2006.01) |

(52) U.S. Cl.
CPC .............. *B23P 6/00* (2013.01); *G06Q 30/06* (2013.01); *Y10T 29/49718* (2015.01)

(58) Field of Classification Search
CPC ...... B23P 6/00; G06Q 30/06; Y10T 29/49718
USPC .......................................... 29/402.01, 402.09
See application file for complete search history.

(56) References Cited

U.S. PATENT DOCUMENTS

| | | | |
|---|---|---|---|
| 5,510,029 A | 4/1996 | Benian | |
| 5,819,201 A * | 10/1998 | DeGraaf | G07C 5/006 340/309.7 |
| 6,068,762 A | 5/2000 | Stone et al. | |
| 6,267,875 B1 * | 7/2001 | Leo | B01D 29/15 123/196 A |
| 6,498,457 B1 * | 12/2002 | Tsuboi | B60L 11/007 320/110 |
| 7,090,773 B2 | 8/2006 | Meddock et al. | |
| 7,413,089 B1 | 8/2008 | Tidwell | |
| 7,597,202 B1 | 10/2009 | Tidwell | |
| 8,037,714 B2 * | 10/2011 | Mann, III | B64F 1/364 62/513 |
| 8,187,458 B2 | 5/2012 | Hubbard | |
| 2003/0041731 A1 * | 3/2003 | Paydar | B01D 46/10 95/273 |
| 2003/0192432 A1 * | 10/2003 | Gubler | B01D 46/0058 95/280 |

(Continued)

FOREIGN PATENT DOCUMENTS

WO    WO 2012/040382 A2    3/2012

OTHER PUBLICATIONS

International Search Report from PCT Patent Application No. PCT/US2013/061012 dated May 2, 2014, application now published as WO/2014/047495 on Mar. 27, 2014.

*Primary Examiner* — Sarang Afzali
*Assistant Examiner* — Darrell C Ford
(74) *Attorney, Agent, or Firm* — McDermott Will & Emery LLP

(57) ABSTRACT

A method for exchange of a filter assembly is described, wherein a contaminated filter assembly is exchanged for a refurbished filter assembly or a new filter assembly.

19 Claims, 5 Drawing Sheets

(56) References Cited

U.S. PATENT DOCUMENTS

| | | | |
|---|---|---|---|
| 2004/0020720 A1* | 2/2004 | Flynn | F01M 11/04 184/1.5 |
| 2004/0059618 A1* | 3/2004 | Ford | G06Q 10/20 705/305 |
| 2004/0255783 A1 | 12/2004 | Graham et al. | |
| 2005/0049895 A1* | 3/2005 | Kasahara | G06Q 10/20 705/305 |
| 2006/0021925 A1* | 2/2006 | Stifelman | B01D 27/08 210/232 |
| 2006/0136237 A1 | 6/2006 | Spiegel et al. | |
| 2007/0200664 A1* | 8/2007 | Proska | G08G 1/205 340/5.42 |
| 2008/0014853 A1* | 1/2008 | Kim | B60H 1/00764 454/86 |
| 2009/0030885 A1* | 1/2009 | DePasquale | G06Q 10/02 |
| 2009/0287334 A1 | 11/2009 | Sweat | |
| 2010/0095843 A1 | 4/2010 | Gebert et al. | |
| 2010/0139256 A1* | 6/2010 | DeCarolis | F01N 13/18 60/295 |
| 2011/0041796 A1 | 2/2011 | Sachdev et al. | |
| 2011/0296806 A1 | 12/2011 | Krisko et al. | |
| 2012/0124950 A1* | 5/2012 | Sessions | B01D 46/0005 55/482 |
| 2014/0091001 A1* | 4/2014 | Chan | B42D 15/00 206/459.5 |
| 2014/0283682 A1* | 9/2014 | Hamann | B01D 46/0086 95/10 |

* cited by examiner

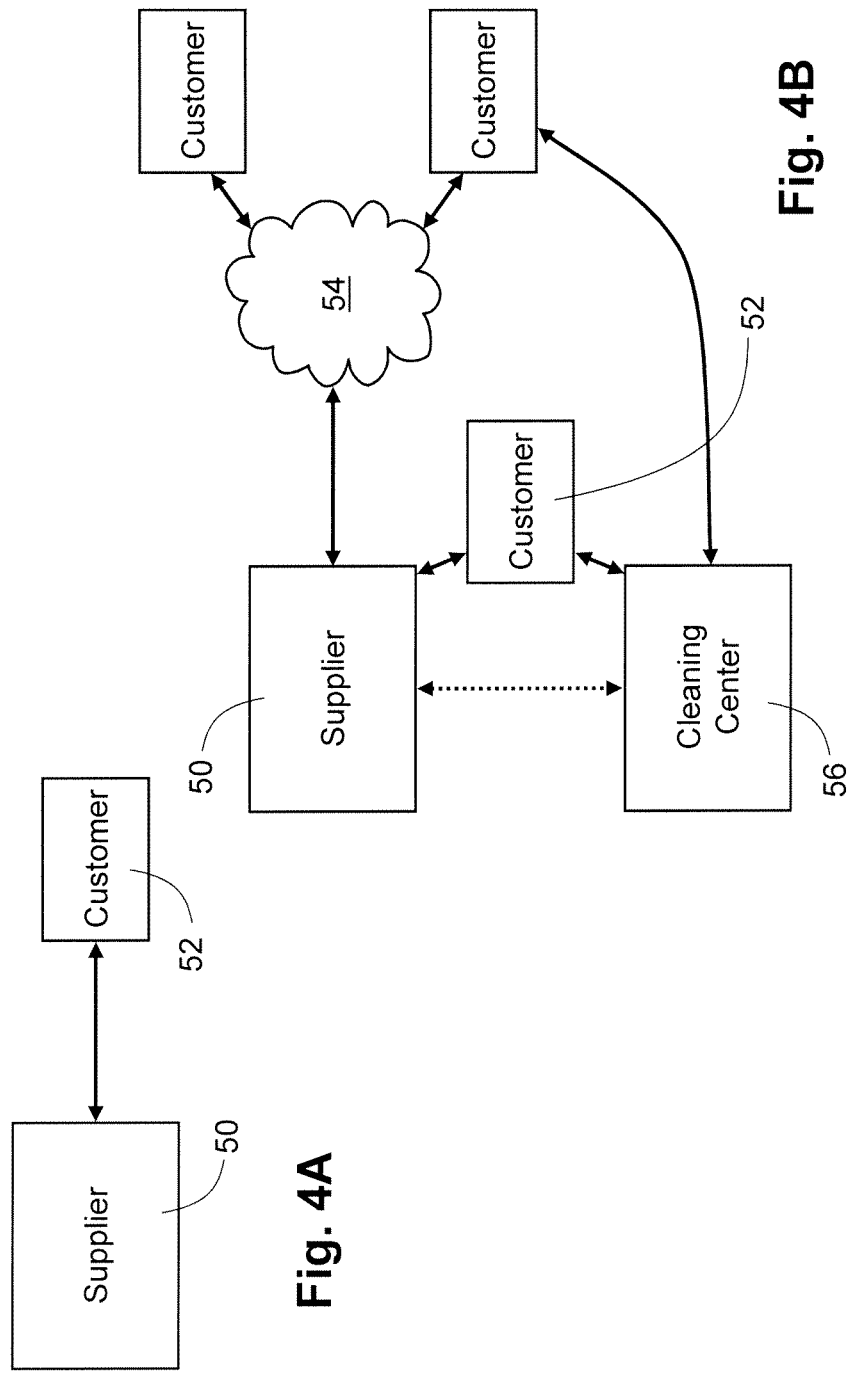

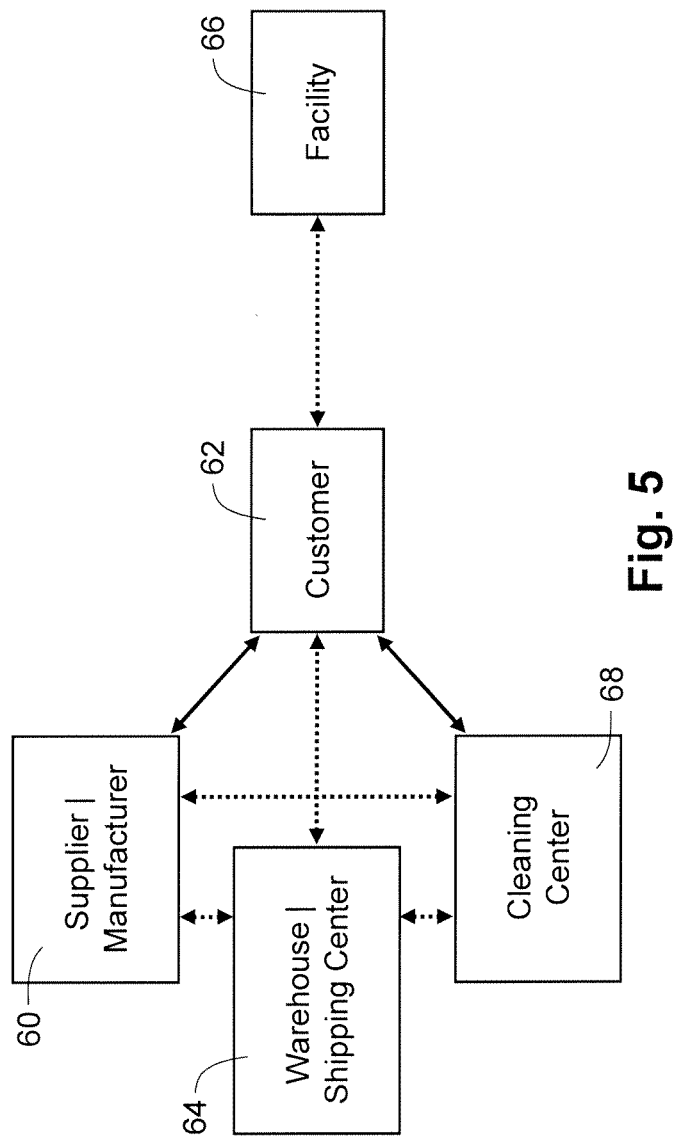

METHOD OF EXCHANGING A FILTER ASSEMBLY

CROSS-REFERENCE TO RELATED APPLICATIONS

This application claims the benefit of U.S. Provisional Application No. 61/704,409, filed Sep. 21, 2012, which is incorporated by reference herein in its entirety.

TECHNICAL FIELD

The subject matter described herein relates to a method for providing a new or refurbished filter and/or a filter assembly to a customer, and to approaches for exchanging a contaminated filter or filter assembly with a new or refurbished filter or filter assembly with a customer.

BACKGROUND

Many types of appliances and equipment require a filter. In many cases, the entire filter is replaced when spent or contaminated. In other cases, a portion or active filtering member of the filter is replaced when spent or contaminated. It would be desirable to provide a filter or the active filter member of a filter that is reusable, for example, by cleaning the filter or active filter portion of a filter, after use, to rejuvenate the filter for continued use. There already exist reusable filters for certain appliances, such as home air filters that can be rinsed on a periodic basis to remove dust and particulate debris, and the cleaned filter reinserted into the appliance. Reusable filters for many other appliances and equipment are not readily available, in part due to a lack of a method or approach for exchanging a used filter in need of cleaning with a new or refurbished filter to a customer in need, and a lack of a means to collect and clean the used or contaminated filters from customers. The present invention solves this, and other, problems.

The foregoing examples of the related art and limitations related therewith are intended to be illustrative and not exclusive. Other limitations of the related art will become apparent to those of skill in the art upon a reading of the specification and a study of the drawings.

BRIEF SUMMARY

The following aspects and embodiments thereof described and illustrated below are meant to be exemplary and illustrative, not limiting in scope.

In one aspect, a method of interaction and exchange of a filter or filter assembly is provided. The method comprises providing or causing to be provided to a facility that interacts with a customer in need of a refurbished filter assembly one or more refurbished filter assemblies; obtaining from the customer a contaminated filter assembly; and cleaning or causing to be cleaned the contaminated filter assembly.

In one embodiment, the method further comprises providing to the facility one or more filters comprised of a housing and a new filter assembly.

In another embodiment, the method further comprises providing to the facility a means for obtaining customer information to determine a recommended filter assembly exchange frequency. In various embodiments, the means for obtaining customer information can include a questionnaire in paper or electronic form, a list of questions to be asked by a customer representative to a customer, a data form to be completed by a customer or a customer representative, the data form in electronic form or hard form. In electronic form the data form or questionnaire can be assessable, via a computer, on a network, the internet, a server (e.g., a cloud based server, dedicated private server, or a local server) or can provided to the facility as part of a software tool or program. The means for obtaining customer information can also be an electronic communication between the appliance in which a filter is disposed and the customer, a facility or a filter supplier.

In yet another embodiment, the method further comprises interacting with the facility to determine a number of refurbished filter assemblies required in a selected interval to satisfy the recommended filter assembly exchange frequency for its customers in that selected interval.

In another embodiment, the recommended filter assembly exchange frequency is ascertained from information on the data form or questionnaire related to the customer's usage of a filter comprising a filter assembly.

In still another embodiment, the method further comprises creating a customer record based on customer information obtained in response to the data form or questionnaire. In one embodiment, the recommended filter assembly exchange frequency is stored in the customer record.

In still another embodiment, the method further comprises generating a reminder regarding the recommended filter assembly exchange frequency. In one embodiment, the reminder is a reminder to the facility or is a reminder to the customer. In another embodiment, the reminder is an electronic reminder, such as an e-mail message, a text message, or an electronic signal or indicator sent to the appliance or equipment in which the filter is disposed. The reminder can also be a telephone call or document sent by a mail delivery service.

In yet another embodiment, each filter assembly in the one or more refurbished filter assemblies has a unique identifier.

In still another embodiment, the method further comprises providing to the facility a menu of filter assembly exchange options from which a customer may choose. For example, the menu can include an option for a single filter assembly exchange or an option for a plurality of filter assembly exchanges. In another embodiment, the menu of options includes a choice to have a sample of fluid from the appliance, instrument, equipment, engine, etc., in which the filter assembly is disposed taken and analyzed or sent for analysis. Results of the analysis are then provided to the customer, to guide and inform exchange frequency of the filter assembly.

In one embodiment, the filter assembly is an oil filter assembly.

In yet another embodiment, the facility provides automobile maintenance services.

The method can include providing instructions for cleaning or for having cleaned a contaminated filter assembly received from a customer.

In another aspect, a method comprises providing to a customer an oil filter comprising a first filter assembly and a housing member; interacting with the customer to obtain customer information including a contact information and a frequency request; and providing to the customer in accord with the frequency request a reminder of a need for a further filter assembly or a further filter assembly.

In one embodiment, the method further comprises receiving or causing another to receive from the customer the first filter assembly in a used or spent condition; and cleaning or arranging for cleaning the first filter assembly.

In other embodiments, interacting comprises interacting over the internet or interacting with a customer representative.

In yet another embodiment, a customer record that contains the customer information is created, and the customer record is updated when a further filter assembly is provided to the customer and/or when a reminder is sent to the customer.

In another embodiment, each filter assembly has a unique identifier and the customer record includes the unique identifier on the first filter assembly and the further filter assembly provided to the customer.

In other embodiments, the customer frequency request is a single request wherein the customer receives two filter assemblies separated by a return of one filter assembly; or the frequency request is a single request wherein the customer receives four filter assemblies and returns three filter assemblies; or the frequency request is a single request wherein the customer receives seven filter assemblies and returns six filter assemblies.

In another embodiment, the customer is provided with a packaging unit in conjunction with a filter assembly, wherein the packaging unit comprises a liquid impermeable internal lining. In another embodiment, the packaging unit includes postage for sending by a mail service provider.

In still another embodiment, the method comprises cleaning or arranging for cleaning a contaminated filter assembly.

In yet another aspect, a method of exchange comprises delivering or causing to be delivered to a customer a refurbished filter assembly and a packaging unit; and receiving or causing to receive from the customer a contaminated filter assembly disposed within the packaging unit.

In one embodiment, the method further comprises, prior to the delivering or causing to be delivered, providing to the customer a filter comprising a housing and a new filter assembly.

In another embodiment, the method further comprises, prior to the delivering or causing to be delivered, providing to the customer an oil filter comprising a new filter assembly or a refurbished filter assembly.

In one embodiment, delivering or causing to be delivered comprises delivering via a mail service provider the refurbished filter assembly and the packaging unit.

In another embodiment, the method further comprises depositing the refurbished filter assembly and the packaging unit with the mail service provider, and notifying the customer of that the assembly has been deposited. Notification to the customer can be by electronic means, such as an e-mail message or a text message.

In one embodiment, the packaging unit includes a pre-printed mailing address label. In another embodiment, the refurbished filter assembly is within the packaging unit upon its delivery to the customer. In an alternative embodiment, the refurbished filter assembly and the packaging unit are provided to the customer together in a mailing member.

In any of the foregoing methods and embodiments, the contaminated filter assembly is contaminated with a byproduct from its environment of use. The byproduct, in one embodiment, is selected from oil, coolant, water, and a product of combustion.

In any of the foregoing methods and embodiments, the contaminated filter assembly to be exchanged for a refurbished filter assembly is less than the entire filter; that is the filter assembly is a part of the filter, and preferably can be securely inserted into a filter housing in a fluid tight relationship. In one embodiment, the filter housing remains secured to its environment of use during the process of removing the contaminated filter assembly and inserting a refurbished filter assembly.

Additional embodiments of the present methods will be apparent from the following description, drawings, examples, and claims. As can be appreciated from the foregoing and following description, each and every feature described herein, and each and every combination of two or more of such features, is included within the scope of the present disclosure provided that the features included in such a combination are not mutually inconsistent. In addition, any feature or combination of features may be specifically excluded from any embodiment of the present invention. Additional aspects and advantages of the present invention are set forth in the following description and claims, particularly when considered in conjunction with the accompanying examples and drawings.

BRIEF DESCRIPTION OF DRAWINGS

FIGS. 4A-4B illustrate another approach for exchange of a contaminated filter assembly with a refurbished filter assembly in a community of filter assembly supplier, customers, and a cleaning center; and FIG. 5 shows another approach for exchanging a population of refurbished filter assemblies with a customer base.

DETAILED DESCRIPTION

Figure 1:
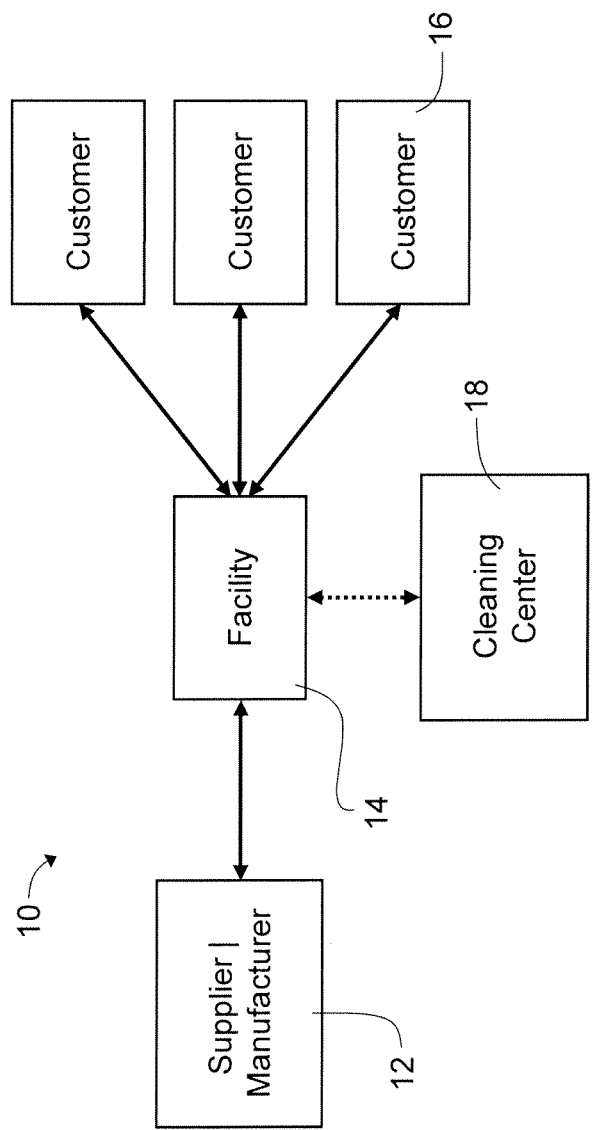
FIG. 1 is a diagram depicting an approach for providing a filter or filter assembly to a customer, according to a first embodiment.

Various aspects now will be described more fully hereinafter. Such aspects may, however, be embodied in many different forms and should not be construed as limited to the embodiments set forth herein; rather, these embodiments are provided so that this disclosure will be thorough and complete, and will fully convey its scope to those skilled in the art.

I. Definitions

As used in this specification, the singular forms "a," "an," and "the" include plural referents unless the context clearly dictates otherwise. Thus, for example, reference to a "polymer" includes a single polymer as well as two or more of the same or different polymers, reference to an "excipient" includes a single excipient as well as two or more of the same or different excipients, and the like.

Where a range of values is provided, it is intended that each intervening value between the upper and lower limit of that range and any other stated or intervening value in that stated range is encompassed within the disclosure. For example, if a range of 1 µm to 8 µm is stated, it is intended that 2 µm, 3 µm, 4 µm, 5 µm, 6 µm, and 7 µm are also explicitly disclosed, as well as the range of values greater than or equal to 1 µm and the range of values less than or equal to 8 µm.

II. Methods of Exchange

Personal and commercial/industrial appliances, instruments, systems, equipment and motors utilize one or more filters. In general, filters in chemistry, engineering and household applications (as opposed to optics) are designed to impede or block movement of certain physical substances while permitting other substances to pass. Filters typically are comprised of a housing member and a filter assembly, that may fit within or on the housing member. The filter assembly is comprised of a primary filter with certain porosity parameters selected according to the application. For example, a primary ceramic filter in a system for water decontamination can have porosity parameters of pore width, pore size distribution and proportion of open and closed porosity tailored according to the end use intended for the water and the contaminants present in the water. A primary filter made of a metal, such as stainless steel or titanium, is produced in a range of configurations and pore sizes to perform in applications where a gas or a liquid is being filtered. As used herein, reference to "filter assembly" intends the portion of a filter that includes at least the primary filter. The filter assembly can comprise only the primary filter, or can comprise the primary filter and a supporting structure, such as a frame or housing, that engages a housing member. Together the housing member and the filter assembly comprise a filter.

The methods to be described herein are applicable, as will be appreciated, to any type of filter in any time of application, household or commercial. Where needed herein to illustrate a point, and merely for purposes of illustration, reference will be made to an oil filter as exemplary of filters in general for which the methods apply. An exemplary oil filter is disclosed in U.S. Pat. No. 8,187,458 and PCT Publication No. WO 2012/040382, the entirety of which are incorporated by reference herein. The exemplary oil filter is comprised of a housing and a filter assembly that fits within the housing. The filter assembly, in one embodiment, is comprised of a primary filter having a first porosity of generally between 0.1-500 microns, more preferably between 1-200 microns, more preferably of less than about 150 microns, 100 microns, 75 microns, 50 microns, 25 microns or 10 microns. In another embodiment, the filter assembly is comprised of a primary filter having a first porosity and a secondary filter having a second porosity. In one embodiment, the second porosity is greater than the first porosity. The porosity of the optional secondary filter can be any of the aforementioned ranges of porosity. The primary and secondary filters, in one embodiment, are dimensioned to fit concentrically in fluid communication. The filter assembly can additionally comprise a valve the controls fluid flow from the housing to the filter and/or from the primary filter to the secondary filter.

Turning now to FIG. 1, a diagram of a first method 10 of exchange of a filter or filter assembly is illustrated. A filter supplier or manufacturer 12 provides to a facility 14 a filter and/or a filter assembly. Hereinafter reference will be made to a "supplier" to intend an entity that either supplies, manufactures, or both a filter and/or filter assembly. For simplicity, reference will be made to a supplier providing a "filter assembly", although it is contemplated that the supplier may provide one or both of a filter comprising the filter assembly and the filter assembly. Facility 14 is, for example, a service provider, repair shop, automotive center, or the like, that is capable of servicing an appliance, system, instrument, motor, equipment, etc. that includes a filter. A customer, such as customer 16, interacts with the facility. Typically, and in one embodiment, the customer is in possession of a filter with a filter assembly that is spent or contaminated and in need of replacement. Customer 16 brings the filter, or more typically, the equipment in which the filter and its filter assembly are disposed, to the facility to have the filter assembly changed or replaced. In accord with the method, the facility removes the contaminated filter assembly from the filter in the customer's equipment, and exchanges the contaminated filter assembly with a new or refurbished filter assembly. The facility is then in possession of the contaminated filter assembly.

The filter assembly is manufactured and designed to be reusable. Accordingly, the method comprises cleaning or arranging for cleaning of the filter assembly. Cleaning can be accomplished directly at the facility, or, alternatively, the facility can send the contaminated filter assembly to a cleaning center 18 for cleaning. The cleaning process removes the contaminants and yields a refurbished filter assembly, that is then available for exchange with another customer. A skilled artisan will appreciate that the cleaning process is selected according to the primary filter type (e.g., material, porosity) and the physical properties of the contaminant(s) to be removed. Examples of "cleaning" a filter assembly include sterilizing (e.g., in an autoclave), high pressure washing, soap and water solutions, organic solvents, ultrasonic cleaning, and combinations thereof.

As can be appreciated from the description of FIG. 1, the method of exchange involves exchange of a filter assembly rather than the entire filter. The method of exchange also involves exchange of a reusable filter assembly, preferably for a refurbished filter assembly. In connection with the first point, the equipment/instrument/appliance comprises a filter that comprises a filter assembly and a housing or other support structure for the filter assembly. The filter assembly includes at least the primary filter, i.e., the porous medium that retains certain substances in a fluid (gas or liquid) and permits passage of other substances in the fluid. The retained substances are referred to as "contaminants", and a primary filter with a diminished performance due to retained contaminants is referred to a 'contaminated' or 'spent' filter assembly. In connection with the second point, the primary filter and preferably the filter assembly are manufactured of a material that can be cleaned to remove the contaminants to yield a regenerated primary filter, also referred to herein as a refurbished filter assembly. Primary filters of ceramics and metals are exemplary.

Figure 2:
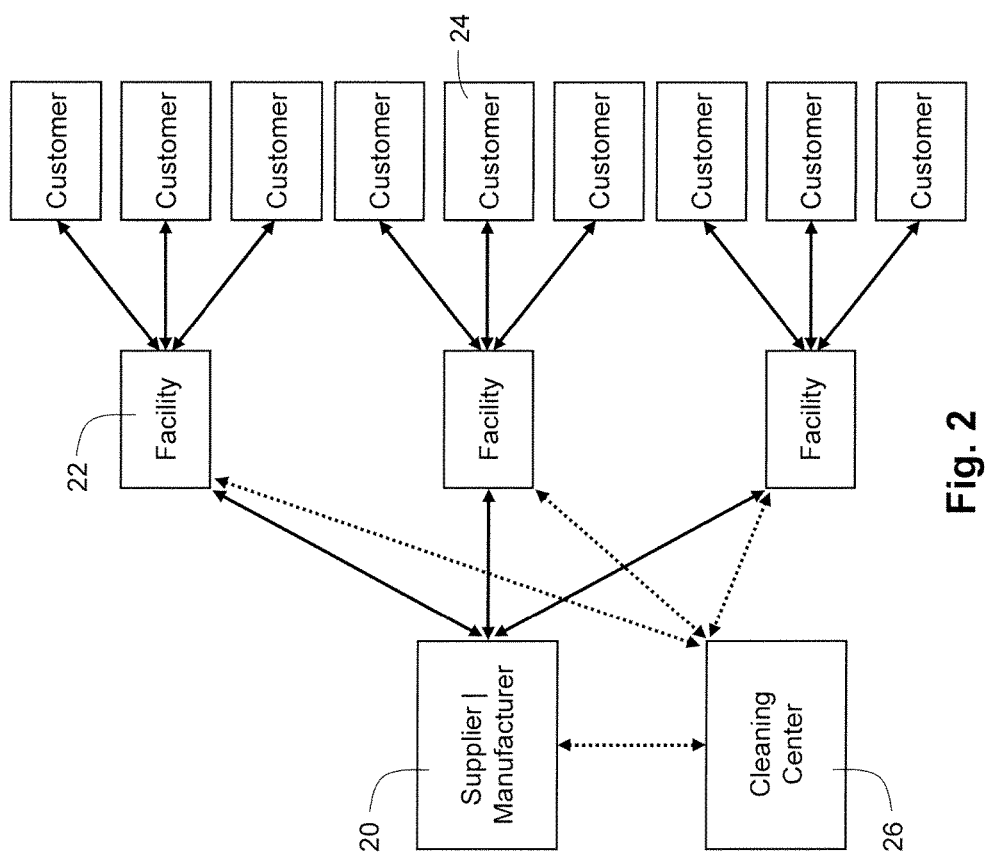
FIG. 2 is a diagram depicting another approach for providing a filter or filter assembly to a customer, according to another embodiment.

It is contemplated that the method described with respect to FIG. 1 can involve more than one facility, and in some embodiments, more than one cleaning center or a single cleaning center. FIG. 2 illustrates a method wherein a supplier 20 provides new or refurbished filter assemblies to a plurality of facilities, such as facility 22. Each facility in the plurality interacts with customers, such as customer 24, that are in possession of a filter with a contaminated filter assembly in need of exchange. The facility removes the contaminated filter assembly from the customer's filter and exchanges it for a refurbished filter assembly. With time, the facility accumulates a collection of contaminated filter assemblies. The plurality of contaminated filter assemblies are cleaned, either on-site at the facility or at a cleaning location 26 that is physically separated from the facility. One or more facilities can utilize a single cleaning location, as indicated in FIG. 2. The cleaning center after subjecting the contaminated filter assemblies to a cleaning process returns the refurbishes filter assemblies to the facilities or to the supplier.

In one embodiment, each filter assembly comprises a unique identifier, such as a numerical identifier or bar code (one dimensional or two dimensional). The facility records the unique identifier of each contaminated filter assembly obtained from its customers, and/or the cleaning center records the unique identifier of each contaminated filter assembly it receives and/or records the unique identifier of each refurbished filter assembly it cleans and returns to a facility.

Figure 3:
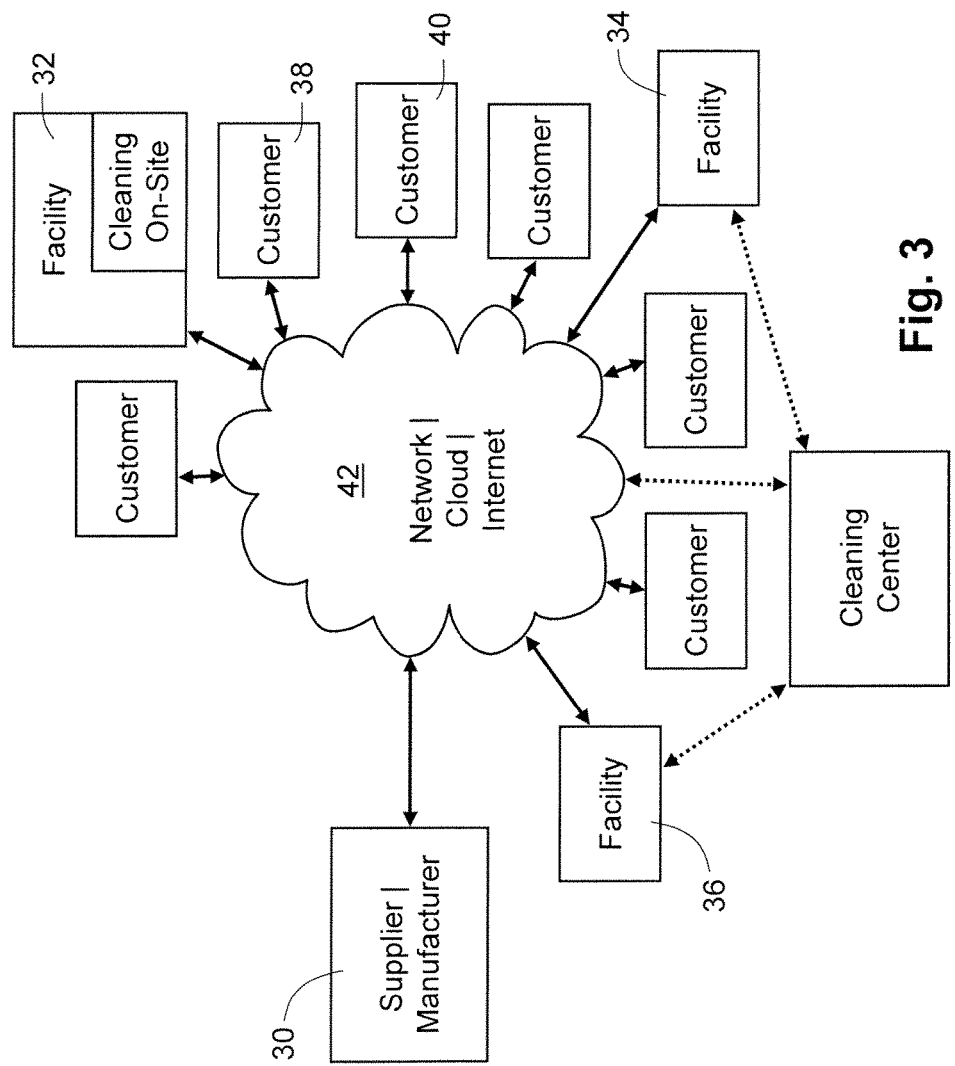
FIG. 3 is a diagram that illustrates an approach for interaction between the members of the exchange community participating in a method of exchange.

The method also contemplates providing a means for obtaining customer information to determine a recommended filter assembly exchange frequency. With reference to FIG. 3, an embodiment of this concept is illustrated, where members of an exchange community include a filter supplier 30, a plurality of facilities, 32, 34, 36, and a plurality of customers, such as customers 38, 40. These community members can interact, directly or indirectly, via an interface 42, which can take the form of an internet web page, a network, a shared server, or the like. By way of interface 42, a customer is invited or prompted to provide information regarding his/her filter assembly. For example, if the filter assembly is part of a filter in an automobile, the customer may be prompted to provide information related to the type of vehicle, type of oil, and miles driven since the last oil change, along with contact information, such as a name, phone number and e-mail address. Interface 42 is also contemplated to be a more traditional paper questionnaire that a customer completes during a visit to a facility, and is also contemplated to be a customer representative that poses appropriate questions to a customer. Interface 42 can also be a data form or questionnaire in electronic form that is assessable via a computer, on a network, the internet, a server (e.g., a cloud based server, dedicated private server, or a local server) or can provided to the facility as part of a software tool or program. Interface 42 is also contemplated to be an electronic communication between the appliance in which a filter and filter assembly are disposed and the customer, a facility or a filter supplier. For example, an automobile with a global positioning system (GPS) or other communication system can send a signal to the customer or a service facility when the vehicle odometer reaches certain mileages, indicating a need to exchange the vehicle's filter assembly. Alternatively, a sensor positioned in the automobile that senses a physical or chemical parameter of an engine fluid (such as motor oil, coolant, etc) can signal that a filter assembly exchange is needed. For example, a sensor for engine oil viscosity can send a signal when the oil viscosity increases to a certain level, the signal can be received by a system within the automobile, including a system in the car that communicates with a third party that provides roadside assistance, navigation and crash response.

Using the information obtained from a customer, a recommended filter assembly exchange frequency is determined. For example, for a filter assembly associated with a motor vehicle, a recommended filter assembly exchange frequency is determined based on the number of miles driven in a defined period, the driving conditions, and perhaps other parameters particular the any given motor vehicle. The information obtained from the customer is used to create a customer record that is filed or stored, electronically or otherwise. The customer record can include the recommended filter assembly exchange frequency, and in one embodiment, the method contemplates a reminder being generated to remind the customer and/or the facility that the filter assembly is due for exchange. Such a reminder can be sent to a customer by a mail service provider, for example, a postcard or letter, by electronic means, for example an e-mail communication or a text message, or by a satellite messaging system that interacts with, for example, a GPS system in a motor vehicle.

The information obtained from a customer can also be used, in other embodiments, to determine a number of refurbished filter assemblies required in a selected interval to satisfy the recommended filter assembly exchange frequency for customers of a particular facility or customers likely to frequent particular facilities.

The method further comprises, in another embodiment, a menu of filter assembly exchange options from which a customer may choose. The menu of options can be provided by the filter supplier to a facility. Alternatively, a facility may determine menu options that it offers to its customers. The menu options can also be provided on the interface to which members of the exchange community access. Menu options can include, for example, an option for a customer to request a single filter assembly exchange or an option for a plurality of filter assembly exchanges. With regard to the latter option, an example is an option to receive three refurbished filter assemblies. The customer returns to the facility on three separate occasions to have the contaminated filter assembly in his/her possession exchanged (replaced) with a refurbished filter assembly. Another example is an option to receive six refurbished filter assemblies, wherein the customer comes to the facility six (or fewer) times to have a spent filter assembly exchanged with a refurbished filter assembly. A menu option for a plurality of filter assembly exchanges can be offered to a customer at a price less than a single exchange, and is desirable for customers that own or control more than one appliance, equipment, or motor with filter assemblies. For example, a company with a fleet of vehicles can select an option for a plurality of exchanges, and use the plurality of exchanges on different vehicles.

In another embodiment, the menu of options includes an option for analysis of a chemical or physical property of fluid from the appliance, instrument, equipment, engine, etc., in which the filter assembly is disposed. Results of the analysis are then provided to the customer or the facility, to guide and inform exchange frequency of the filter assembly. For example, amount of certain contaminants or viscosity of oil from a motor engine can be ascertained, and the level of contaminants or viscosity relied on to determine whether a filter assembly exchange is needed and/or to determine a recommended frequency of filter assembly exchange.

Another approach for exchange of a contaminated filter assembly is depicted in FIGS. 4A-4B. In this approach, a filter comprising a first filter assembly and a housing member is provided to a customer. Generally, there is a direct interaction between the supplier or manufacturer 50 (which may be the same entity) of the new, unused filter and a customer 52 who purchases the filter directly from the supplier. The supplier interacts directly with, or indirectly via an interface 54 (FIG. 4B), with the customer to obtain customer information including a contact information and an exchange of filter assembly frequency request. The exchange of filter assembly frequency request will depend, for example, on the filter type and environment of use, and a replacement frequency is generally provided by the supplier of the filter. Based on the customer's frequency request, a reminder of a need for a further filter assembly or a further filter assembly is provided to the customer, by the supplier directly or indirectly via interface 54. The reminder can take the form of any of those described above.

As seen in FIG. 4B, the method of exchange can include receiving or causing another to receive from the customer the first filter assembly in a used or spent condition and cleaning or arranging for cleaning the first filter assembly. For example, a cleaning center 56 receives contaminated filter assemblies from customers of the supplier, wherein in one embodiment, the cleaning center can be an authorized cleaning provider of the supplier, as indicated by the dashed line linking the supplier and cleaning center. The cleaning center processes the contaminated filter assemblies to remove contaminates and provides refurbished filter assemblies that can be provided to the supplier or to the customers.

In the method illustrated in FIGS. 4A-4B, information can be obtained from a customer by a direct interaction between the supplier and the customer or indirectly over interface 54, which can be for example the internet. As described above, the customer information is used to create a customer record that contains the customer's frequency request and other information, such as a preferred contact method. The customer record is updated when a further filter assembly is provided to the customer.

Each filter assembly can have a unique identifier and the customer record includes the unique identifier on the first filter assembly and on the further filter assembly provided to the customer.

In this embodiment, the customer may also select from a menu of exchange options. For example, the customer can make a single request for two exchanges, wherein the customer receives two refurbished filter assemblies separated by a return of one filter assembly. Alternatively, the customer can make a single request to receive four refurbished filter assemblies, wherein receipt of each of the four refurbished filter assemblies is separated by the customer's return of three contaminated filter assemblies. Alternatively, the customer can make a request to receive seven refurbished filter assemblies, wherein the customer returns six contaminated filter assemblies separately and individually after receipt individually of each of the seven refurbished filter assemblies.

The customer can be provided with a packaging unit in conjunction with a refurbished filter assembly, wherein the packaging unit comprises a liquid impermeable internal lining and/or sufficient postage for sending the packaging unit and a contaminated filter assembly by a mail service provider.

In a further aspect, yet another method of exchange of a filter assembly is contemplated. This method is illustrated in FIG. 5, where a filter or filter assembly supplier or manufacturer 60 delivers to a customer 62 a refurbished filter assembly and a packaging unit. The customer possesses a filter comprising a first (new or refurbished) filter assembly, that is contaminated and in need of replacement. The customer, for example, may have purchased a filter (with a new filter assembly) from the supplier or may have purchased or acquired the appliance or equipment or vehicle with a filter and the first filter assembly (new or refurbished). It is also contemplated that the refurbished filter assembly and packaging unit can be caused to be delivered by supplier 60, intending that supplier 60 does not directly ship the refurbished filter assembly to the customer but arranges for delivery to the customer. For example, the supplier can be in a relationship with a warehouse or shipping center 64 and arrange for refurbished filter assemblies to be sent from the warehouse to customers.

The customer receives via a mail service provider the refurbished filter assembly and the packaging unit. The two items, the refurbished filter assembly and the packaging unit, can be packaged together in a box, envelope or other shipping container. Alternatively, the refurbished filter assembly can be shipped and delivered to the customer with the packaging unit.

The customer upon receipt of the refurbished filter assembly can exchange the contaminated filter assembly with the refurbished filter assembly himself or herself, or can take the appliance, equipment or vehicle to a third party, such as a service facility 66, to do the exchange. The contaminated filter assembly is then placed in the packaging unit and deposited with, or picked up by, a mail delivery service for return to either supplier 60 or to a cleaning center 68 (which can be affiliated with supplier 60) for processing. The packaging unit when provided to the customer can include a pre-printed mailing address label for return to the cleaning center or the supplier, and can also be designed to safely contain for shipping the contaminated filter assembly. For example, a packaging unit can be internally lined with a fluid impermeable material, to contain a filter assembly contaminated with oil, coolant, or by-products of combustion.

The customer in this business model can interact with the supplier of the refurbished filter assemblies to select from a menu of options regarding frequency of exchange of a contaminated filter assembly for a refurbished filter assembly. Options for exchange can be presented to the customer, for example, over the supplier's website, telephonically or by way of a data form or questionnaire to be completed by the customer (electronically, verbally or physically). For example, a customer that owns three automobiles each having a filter with a reusable filter assembly can select from the menu of options to receive a package of six exchanges. The customer pays a fee for six exchanges, and indicates a desired exchange frequency. For example, the customer may request to have a refurbished filter assembly delivered once per month, or once every other month. The supplier the delivers, or causes to have delivered, a refurbished filter assembly and a return packaging unit to the customer in accord with the desired exchange frequency. In one embodiment, a notification is sent to the customer when a refurbished filter assembly is to be or has been deposited with a mail service provider for delivery to the customer.

Upon receipt of the refurbished filter assembly, the customer exchanges the contaminated filter assembly in his/her possession with the received refurbished filter assembly, and using the pre-paid, pre-labeled packaging unit sends the contaminated filter assembly to the supplier or a designated cleaning site. The contaminated filter assembly is processed for cleaning, and is placed back into a population of refurbished filter assemblies for delivery to customers.

The refurbished filter assemblies in the population for the exchange program preferably each include a unique identifier. The supplier and/or cleaning site record the unique identifier of each assembly, as a means to track usage and condition of each assembly.

In any of the foregoing methods and embodiments, the contaminated filter assembly is contaminated with a byproduct from its environment of use. The byproduct, in one embodiment, is selected from oil, coolant, water, and a product of combustion.

III. Examples

The following examples are illustrative in nature and are in no way intended to be limiting.

Example 1

Method of Exchange

An individual owns a reusable filter fitted within the engine of his automobile. The reusable filter includes a filter assembly with a primary metal filter and a second metal filter in fluid communication by a pressure-activated ball valve. After 10,000 miles of use, the individual drives his car to a nearby service facility to have the filter assembly exchanged.

While at the service center, the individual completes a data form accessible over the internet on a computer situated in a kiosk at the service facility. The data form prompts the individual for his name, residential address, e-mail address, mobile phone number, make, model and year of car, and current mileage. A customer record is created based on the information, and the record is stored on a server accessible by the facility and the supplier of the filter assemblies.

The individual reviews a menu of exchange options available, and selects an option for three exchanges. From the information and the selection of a three-exchange option, a software program or a customer representative determines a recommended exchange frequency, and a reminder prompt calendared to be sent to the customer for the future exchanges.

While at the facility, the contaminated filter assembly is removed from the filter in the customer's car. The contaminated filter assembly is set aside for cleaning, and a refurbished filter assembly is inserted into the housing member of the filter, which remains attached to the engine of the automobile.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method, comprising:
providing, or causing to be provided, to a customer a filter comprised of a housing and a filter assembly, wherein the customer uses the filter which results in a contaminated filter assembly and wherein the filter is an oil filter attached to an automobile engine and within an automobile;
providing, or causing to be provided, to a facility that interacts with a customer in need of a refurbished filter assembly, one or more refurbished filter assemblies;
obtaining from the customer the contaminated filter assembly in exchange for a refurbished filter assembly from the one or more refurbished filter assemblies, the obtaining comprising removing the contaminated filter assembly from the housing of the oil filter and inserting the refurbished filter assembly into the housing of the oil filter, wherein the housing member of the oil filter remains attached to the automobile engine; and
cleaning, or causing to be cleaned, the contaminated filter assembly to create a refurbished filter assembly that is added to a population of refurbished filter assemblies for exchange with a contaminated filter assembly of a customer.

2. The method of claim 1, further comprising providing to the facility one or more filters comprised of a housing and a new filter assembly.

3. The method of claim 1, further comprising providing to the facility a means for obtaining customer information to determine a recommended filter assembly exchange frequency.

4. The method of claim 3, further comprising interacting with the facility to determine a number of refurbished filter assemblies required in a selected interval to satisfy the recommended filter assembly exchange frequency for customers of the facility in that selected interval.

5. The method of claim 3, wherein the means for obtaining customer information is a data form or a questionnaire.

6. The method of claim 5, wherein the data form or questionnaire is accessible on a network, computer, internet or cloud server.

7. The method of claim 5, wherein the recommended filter assembly exchange frequency is ascertained from information on the data form or questionnaire related to the customer's usage of a filter comprising a filter assembly.

8. The method of claim 7, wherein the method further comprises creating a customer record based on customer information obtained in response to the data form or questionnaire.

9. The method of claim 8, wherein the recommended filter assembly exchange frequency is stored in the customer record.

10. The method of claim 3, further comprising generating a reminder regarding the recommended filter assembly exchange frequency.

11. The method of claim 10, wherein the reminder is a reminder to the facility or is a reminder to the customer.

12. The method of claim 10, wherein the reminder is an electronic reminder.

13. The method of claim 12, wherein the electronic reminder is an e-mail message or a text message.

14. The method of claim 10, wherein the reminder is selected from a telephone call or document sent by a mail delivery service.

15. The method of claim 1, wherein each filter assembly in the one or more refurbished filter assemblies has a unique identifier.

16. The method of claim 1, further comprising providing to the facility a menu of filter assembly exchange options from which a customer may choose.

17. The method of claim 16, wherein the menu of filter assembly exchange options comprises an option for a single filter assembly exchange.

18. The method of claim 16, wherein the menu of filter assembly exchange options comprises an option for a plurality of filter assembly exchanges.

19. The method of claim 1, wherein the facility provides automobile maintenance services.

* * * * *